United States Patent Office 2,868,832
Patented Jan. 13, 1959

2,868,832

METHOD OF REMOVING ACIDS FROM AQUEOUS SOLUTIONS WITH PHOSPHATE SALTS OF QUATERNARY AMMONIUM ANION EXCHANGE RESINS

Frank C. Taylor, Jr., and Hilmer L. Aamoth, Bay City, Mich., assignors to The Dow Chemical Company, Midland, Mich., a corporation of Delaware No Drawing. Application May 23, 1957
Serial No. 661,025

5 Claims. (Cl. 260—499)

This invention concerns improvements in a method of removing acids from aqueous solutions of mixed solutes with quaternary ammonium anion exchange resins. It relates more particularly to a method of absorbing an ionized acid solute from an aqueous solution of mixed solutes on a polyvalent phosphate salt form of a quaternary ammonium anion exchange resin.

Ion exchange resins are commonly employed in many processes for the removal of ions from aqueous solutions, e. g. in water purification processes or for removing acids from aqueous solutions. It is usual practice in a process for removing an acid from an aqueous solution to contact the aqueous acidic solution with an anion exchange resin in the basic or hydroxide form, whereby the acid is absorbed by the resin and is removed from the solution. Among anion exchange resins which are known to absorb acids from aqueous solutions, the quaternary ammonium anion exchange resins of the type disclosed in U. S. Patents Nos. 2,591,573 and 2,614,099 are of most practical value. Such anion exchange resins are insoluble resinous copolymers of a predominant amount of a monovinyl aromatic hydrocarbon cross-linked with a minor proportion of a polyvinyl aromatic hydrocarbon, which copolymers contain on the aromatic nuclei substituent groups having the general formula:

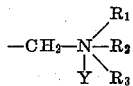

wherein $R_1$ is a monovalent hydrocarbon radical, $R_2$ and $R_3$ are members of the group consisting of a hydrocarbon radical and the radicals

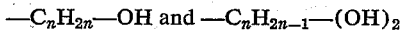

wherein $n$ is an integer from 1 to 4, and Y is an anion such as a chloride, sulfate, or hydroxyl ion. When employing such anion exchange resins in their basic or hydroxide form for the removal of acids from aqueous solutions, the anions of the acid are absorbed by the resin and are removed from the solution while hydroxyl ions are displaced from the resin into the solution.

U. S. Patent No. 2,772,237 describes a process for removing acids from aqueous solutions of organic solutes wherein an aqueous solution of an organic solute containing an acid having an ionization constant at least as great as $1.4 \times 10^{-3}$ at 25° C., e. g. an aqueous solution of ethylene glycol and hydrochloric acid, an aqueous solution of glycerine and sulfuric acid, etc., is fed into contact with a water-immersed bed of the sulfate form of a quaternary ammonium anion exchange resin, whereby the acid is absorbed by the resin and converts at least a part of the anion exchange resin to the bisulfate form and is thus removed from the aqueous solution of the organic solute.

It has now been discovered that the di- or trivalent phosphate salt form of quaternary ammonium anion exchange resins readily absorb water-soluble acids or acidic compounds having ionization constants greater than the ionization constant of the resin from aqueous solutions of organic solutes without displacement of ions from the resin into the solution. More specifically, it has been found that quaternary ammonium anion exchange resins of the above-mentioned type containing divalent phosphate ions of the formula $HPO_4^{--}$ or trivalent phosphate ions of the formula $PO_4^{---}$, or a mixture of such polyvalent phosphate ions, readily absorb acids having an ionization constant greater than $6.2 \times 10^{-8}$ or greater than $4.8 \times 10^{-13}$ at 25° C., depending upon whether the di- or trivalent phosphate salt form of the resin is employed, from aqueous solutions containing the acid and one or more water-soluble non-ionized organic compounds such as monohydric or polyhydric alcohols or monoethers of polyhydric alcohols, e. g. lower aliphatic alcohols, ethylene glycol, propylene glycol, glycerine or monomethyl ether of ethylene glycol.

The chemical reactions which occur when an acid such as hydrochloric acid or acetic acid is absorbed by a polyvalent phosphate salt form of a quaternary ammonium anion exchange resin containing trimethylammonium groups is illustrated by the equations:

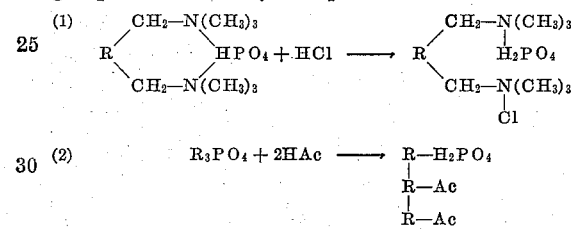

wherein R represents the anion exchange resin matrix and HCl and HAc represent hydrochloric acid and acetic acid, respectively.

The process is carried out by bringing the aqueous acidic solution of the mixed solutes of the kind to be separated, e. g. an aqueous solution of ethylene glycol and hydrochloric acid, formic acid or acetic acid, into contact with a polyvalent phosphate salt form of a quaternary ammonium anion exchange resin and separating the so-treated solution from the resin.

The method is conveniently carried out by feeding an aqueous acidic solution of the mixed solutes of the kind to be separated into contact with a bed of the anion exchange resin in a suitable column or vessel and withdrawing the treated solution as effluent liquor.

The amount of the aqueous acidic solution of the mixed solutes that is fed to a bed of the resin should not exceed an amount corresponding to that containing more than 50 percent of the acid chemically equivalent to the divalent phosphate ion $HPO_4^{--}$ or more than 66⅔ percent of that chemically equivalent to the trivalent phosphate ion $PO_4^{---}$ in the resin bed as shown by the above equations in order to avoid displacing phosphate ions from the resin into the solution.

The method can be employed for separating or removing any water-soluble acid having an ionization constant greater than the ionization constant of the polyvalent phosphate salt form of the quaternary ammonium anion exchange resin, i. e. an ionization constant greater than $6.2 \times 10^{-8}$ or greater than $4.8 \times 10^{-13}$ at 25° C., depending upon whether the $HPO_4$ or the $PO_4$ salt form of the resin is used, from an aqueous solution. For example, the method can be employed to remove hydrochloric acid from an aqueous solution of the same and glycerol or an alcohol, e. g. methyl alcohol, ethyl alcohol or isopropyl alcohol; acetic acid, formic acid or propionic acid from an aqueous solution of ethylene glycol, or lower aliphatic alcohols; or boric acid from an aqueous solution of ethylene glycol, monomethyl ether or ethyl alcohol.

The method is advantageously employed for separating or removing water-soluble acids having an ionization constant between $1.2 \times 10^{-2}$ and $4.8 \times 10^{-13}$, preferably between $7.5 \times 10^{-3}$ and $4.8 \times 10^{-13}$ at 25° C. from aqueous solutions of non-ionized water-soluble organic compounds such as monohydric and polyhydric alcohols, e. g. ethylene glycol, propylene glycol, glycerine, monomethyl ether of ethylene glycol, methyl alcohol, ethyl alcohol or isopropyl alcohol.

In practice the aqueous acidic soution of the mixed solutes of the kind to be separated from one another is contacted with the polyvalent phosphate salt form of the quaternary ammonium anion exchange resin in the form of small particles, suitable particles of sizes between 20 and 400 mesh per inch as determined by U. S. standard screens, in amount not exceeding an amount of the acid theoretically required to convert the polyvalent phosphate salt form of the anion exchange resin to the corresponding monovalent phosphate salt form having a phosphate ion of the formula $H_2PO_4^-$ attached to the quaternary ammonium group on the resin matrix and thereafter separating the solution from the resin.

The anion exchange resin can be regenerated to a form suitable for absorbing a further quantity of acid by washing or treating the exhausted resin with an aqueous 2–5 weight percent solution of sodium di- or tribasic phosphate ($Na_2HPO_4$ or $Na_3PO_4$) or potassium di- or tribasic phosphate ($K_2HPO_4$ or $K_3PO_4$).

It may be mentioned that when the absorbed acid is an acid having an ionization constant greater than the ionization constant of the phosphate salt form of the anion exchange resin employed, e. g. is an acid such as hydrochloric acid, hydrobromic acid or sulfuric acid, it is necessary to regenerate the resin to the polyvalent phosphate salt form by washing the exhausted resin with an aqueous solution of a di- or tribasic alkali metal phosphate salt in order to displace the absorbed acid from the resin.

In many instances, particularly when the absorbed acid is one having a low degree of ionization such that the ionization constant of the acid is between $7.5 \times 10^{-3}$ and $4.8 \times 10^{-13}$ at 25° C., i. e. is between the values of the ionization constants for the first and third hydrogen atom of phosphoric acid, the anion exchange resin can be regenerated in whole or in part merely by washing the resin with water. Thus formic acid, acetic acid, propionic acid or boric acid which has been absorbed on the polyvalent phosphate salt form of a quaternary ammonium anion exchange resin as herein described is substantially displaced from the resin and the resin is regenerated to a form suitable for absorbing a further quantity of acid by merely washing the exhausted resin with water. The regeneration of the resin with water is carried out by washing a bed of the anion exchange resin with water countercurrent to the direction of flow of the acidic solution of the organic solute through the bed of the resin during absorption of the acid in order to obtain satisfactory regeneration of the anion exchange resin to the polyvalent phosphate salt form.

The following examples illustrate ways in which the principle of the invention has been applied, but are not to be construed as limiting its scope.

*Example 1*

A ⅝ inch diameter glass tube 30 inches long was filled with 100 ml. of a granular quaternary ammonium anion exchange resin to form a bed of the resin approximately 50 centimeters deep. The anion exchange resin was the reaction product of trimethylamine and a chloromethylated copolymer of approximately 87.5 percent by weight of styrene, 4.5 percent ar-ethylvinylbenzene and 8 percent divinylbenzene. The resin was in the form of rounded granules of sizes between 50 and 100 mesh per inch as determined by U. S. standard screens. The anion exchange resin was converted to the divalent phosphate salt form by washing the bed of the resin with an aqueous 0.05 molar solution of potassium dibasic phosphate ($K_2HPO_4$) and was rinsed with deionized water. Thereafter, 400 ml. of an aqueous solution consisting of 50 percent by volume of ethylene glycol and 50 percent of water containing 1.46 grams of hydrochloric acid was fed to the bed of the resin at a rate of from 2–3 ml. per minute. This was followed by the feed of water until all of the ethylene glycol was washed from the bed of the resin. The effluent liquid was collected and found to consist of water and ethylene glycol. All of the hydrochloric acid was absorbed by the divalent phosphate salt form of the resin. The column was inverted and the bed of the resin washed down-flow with four liters of water. The countercurrent water wash did not regenerate the anion exchange resin. The resin can be regenerated to its divalent phosphate form by washing the resin with an aqueous 0.05 molar solution of potassium dibasic phosphate.

*Example 2*

A charge of 100 ml. of a quaternary ammonium anion exchange resin similar to that employed in Example 1 was placed in a ⅝-inch diameter by 30 inches long glass tube. The resin was converted to the divalent phosphate form by washing it with an aqueous 0.05 molar $K_2HPO_4$ solution and was rinsed with water. Thereafter, 400 ml. of an aqueous solution consisting of equal parts by volume of ethylene glycol and water containing 2.4 grams of acetic acid was fed to the column at a rate of from 2–3 ml. per minute. This was followed by the feed of water to flush the ethylene glycol from the bed of the resin. The effluent liquid was collected and found to consist of water and ethylene glycol free from acetic acid. All of the acetic acid was absorbed by the divalent phosphate salt form of the anion exchange resin.

The column was inverted and was washed with 2.5 liters of deionized water. The effluent was collected and analyzed. The effluent liquid contained 1.37 grams of acetic acid. Thus, 57 percent of the absorbed acetic acid was displaced from the anion exchange resin by washing the resin with water.

*Example 3*

A charge of 100 ml. of a granular quaternary ammonium anion exchange resin similar to that employed in Example 1 is placed in a ⅝-inch diameter by 30 inches long glass tube. The anion exchange resin is converted to the trivalent phosphate form by washing the resin with a 0.05 molar aqueous solution of potassium phosphate, $K_3PO_4$, and is rinsed with water. Thereafter, 700 ml. of an aqueous solution of equal parts by volume of ethyl alcohol and water containing 4.23 grams of boric acid is fed to the column at a rate of from 2–3 ml. per minute. This is followed by the feed of water to flush the alcohol from the bed of the resin. The effluent liquid is collected and found to consist of water and ethyl alcohol free from boric acid. The column is inverted and the resin bed is washed with from two to three liters of deionized water. The effluent liquid is collected and found to contain substantially all of the absorbed boric acid. Thus, the anion exchange resin is regenerated to the trivalent phosphate salt form and is suitable for absorbing a further quantity of boric acid from another portion of the feed solution. The cycle of operations can be repeated.

We claim:

1. A method of removing a water-soluble acid from an aqueous solution of a non-ionized water-soluble organic solute, which method comprises bringing an aqueous solution containing at least one non-ionized water-soluble organic compound and a water-soluble acid having an ionization constant greater than $4.8 \times 10^{-13}$ at 25° C. as solutes into contact with particles of at least one phosphate salt form of an insoluble resinous quaternary ammonium anion exchange resin selected from the group consisting of the divalent phosphate salt form and the trivalent phosphate salt form of said anion exchange resin, and separating the solution from the anion exchange resin.

2. A method as claimed in claim 1, wherein the anion exchange resin comprises an insoluble resinous copolymer of a predominant amount of a monovinyl aromatic hydrocarbon cross-linked with from 2 to 20 percent by weight of a divinyl aromatic hydrocarbon, said copolymer containing on the aromatic nuclei substituent groups of the formula:

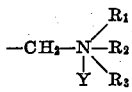

wherein $R_1$ represents an alkyl radical containing from 1 to 4 carbon atoms, $R_2$ and $R_3$ represent members of the group consisting of alkyl radicals and hydroxy alkyl radicals of the formulae $-C_nH_{2n}OH$ and $C_nH_{2n-1}(OH)_2$ wherein $n$ is an integer from 1 to 4, and $Y$ is an anion selected from the group consisting of the divalent prosphate ion of the formula $HPO_4^{--}$ and the trivalent phosphate ion of the formula $PO_4^{---}$.

3. A method of removing a water-soluble acid from an aqueous solution of a non-ionized water-soluble organic solute, which method comprises passing an aqueous solution containing a water-soluble acid having an ionization constant between $4.8 \times 10^{-13}$ and $7.5 \times 10^{-3}$ at 25° C. and a water-soluble nonionized organic compound as solute into contact with a water-immersed bed of a polyvalent phosphate salt form of a quaternary ammonium anion exchange resin comprising at least one polyvalent phosphate salt form selected from the group consisting of the divalent phosphate salt form and the trivalent phosphate salt form of said anion exchange resin, in an amount not exceeding the amount of said acid theoretically required to convert the anion exchange resin to the monovalent phosphate salt form, separating the liquid from the resin and washing the resin with water, whereby the anion exchange resin is regenerated to the polyvalent phosphate salt form.

4. A process as claimed in claim 3, wherein the acid is acetic acid.

5. A process is claimed in claim 3, wherein the organic compound is ethylene glycol.

References Cited in the file of this patent

Lange: "Handbook of Chemistry," 8th edit., 1952, Handbook Publ. Inc., Sandusky, Ohio; p. 1232.